US012777462B2

(12) United States Patent
Lei

(10) Patent No.: US 12,777,462 B2
(45) Date of Patent: Oct. 27, 2026

(54) METHOD AND DEVICE FOR INDICATING AVAILABILITY OF A REFERENCE SIGNAL

(71) Applicant: Spreadtrum Semiconductor (Nanjing) Co., Ltd., Nanjing (CN)

(72) Inventor: Zhenzhu Lei, Nanjing (CN)

(73) Assignee: Spreadtrum Semiconductor (Nanjing) Co., Ltd., Nanjing (CN)

( * ) Notice: Subject to any disclaimer, the term of this patent is extended or adjusted under 35 U.S.C. 154(b) by 350 days.

(21) Appl. No.: 18/554,990

(22) PCT Filed: Apr. 2, 2022

(86) PCT No.: PCT/CN2022/085073
§ 371 (c)(1),
(2) Date: Oct. 11, 2023

(87) PCT Pub. No.: WO2022/218182
PCT Pub. Date: Oct. 20, 2022

(65) Prior Publication Data

US 2024/0163845 A1 May 16, 2024

(30) Foreign Application Priority Data

Apr. 13, 2021 (CN) ......................... 202110395308.0

(51) Int. Cl.
*H04W 68/02* (2009.01)

(52) U.S. Cl.
CPC .................................. *H04W 68/02* (2013.01)

(58) Field of Classification Search
CPC ..... H04W 68/02; H04W 76/27; H04W 76/38; H04L 5/0053; H04L 5/0078; H04L 5/0094; H04L 5/0048; Y02D 30/70
See application file for complete search history.

(56) References Cited

U.S. PATENT DOCUMENTS

| | | | | |
|---|---|---|---|---|
| 2020/0313816 | A1 | 10/2020 | Sun et al. | |
| 2022/0095268 | A1* | 3/2022 | Oh ........................ | H04B 17/345 |
| 2022/0321296 | A1* | 10/2022 | Ye .......................... | H04L 5/0094 |
| 2022/0322281 | A1* | 10/2022 | Liao ..................... | H04W 68/005 |
| 2023/0032593 | A1* | 2/2023 | Chen ..................... | H04L 5/0051 |

(Continued)

FOREIGN PATENT DOCUMENTS

| | | | |
|---|---|---|---|
| CN | 108809595 | A | 11/2018 |
| CN | 109150469 | A | 1/2019 |
| CN | 109196930 | A | 1/2019 |

(Continued)

OTHER PUBLICATIONS

International Search Report (PCT/CN2022/085073); Date of Mailing: Jun. 28, 2022.

(Continued)

*Primary Examiner* — Siu M Lee
(74) *Attorney, Agent, or Firm* — Wiersch Law Group

(57) ABSTRACT

A method and device for indicating availability of a reference signal. The method includes: determining a valid duration of a reference signal availability indication; and in response to receiving the reference signal availability indication, determining availability of a reference signal within a valid time domain range based on the reference signal availability indication. The valid time domain range is determined based on the valid duration.

18 Claims, 6 Drawing Sheets

(56) References Cited

U.S. PATENT DOCUMENTS

| | | | | |
|---|---|---|---|---|
| 2023/0412341 | A1* | 12/2023 | Jung | H04W 68/02 |
| 2023/0422211 | A1* | 12/2023 | Esswie | H04W 72/232 |

FOREIGN PATENT DOCUMENTS

| | | | |
|---|---|---|---|
| CN | 111385826 | A | 7/2020 |
| CN | 111585724 | A | 8/2020 |
| CN | 111585726 | A | 8/2020 |
| CN | 112153740 | A | 12/2020 |
| WO | 2014085997 | A1 | 6/2014 |
| WO | 2021003618 | A1 | 1/2021 |
| WO | 2022177342 | A1 | 8/2022 |
| WO | 2022216213 | A1 | 10/2022 |

OTHER PUBLICATIONS

First Office Action(CN202110395308.0); Date of Mailing: Mar. 26, 2024.

Chinese Office Action(202110395308.0); Date of Mailing: Aug. 13, 2024 (17 pages).

European Search Report issued in corresponding EP Application 22787409.6, issued Sep. 4, 2024, 11 pages.

Lenovo et al:"Provision of TRS/CSI-RS for idle/inactive UEs", 3GPP TSG RAN WG1 Meeting #104bis-e R1-2103615, paragraphs 2-3.

R1-2009201 Provisioning of potential TRS/CSI-RS occasion(s) for Idle/Inactive UEs, 3GPP tsg_ran\wg1_rl1, Entire document.

Huawei et al: "Assistance RS occasions for IDLE/inactive mode", 3GPP Draft; R1-2102317, URL: https://ftp.3gpp.org/tsg ran/WG1 RL1/T sGR1_104b-e/Docs/R1-2102317.zip R1-2102317.docx[retrieved on Apr. 7, 2021] ★ section 2★.

Vivo: "TRS/CSI-RS occasion(s) for idle/inactive UEs", 3GPP Draft; R1-2102533, URL: https:// ftp.3gpp.org/tsg_ran/WG1_RL1/TSGR1_104b-e/Docs/R1-2102533.zip R1-2102533_8.7.1.2.docx[retrieved on Apr. 6, 2021] ★ sections 2-3★.

Ericsson: "Provisioning of TRS occasions to Idle/Inactive UEs", 3GPP Draft; R1-2103643, URL:https:// ftp.3gpp.org/tsg_ran/WG1_RL1/T SGR1_104b-e/Docs/R1-2103643.zip R1-2103643 Provisioning of TRS occasions to IdleInactive UEs.docx [retrieved on Apr. 7, 2021]*sections 2-3 *.

Chinese Notice of Allowance(202110395308.0); Date of Mailing: Dec. 17, 2024(4 pages).

* cited by examiner

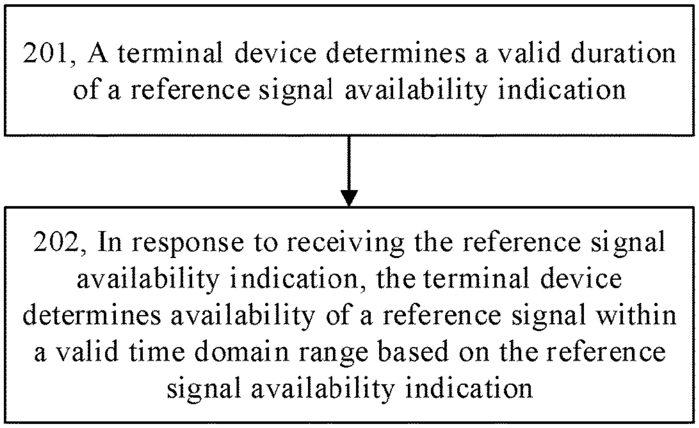
FIG. 4
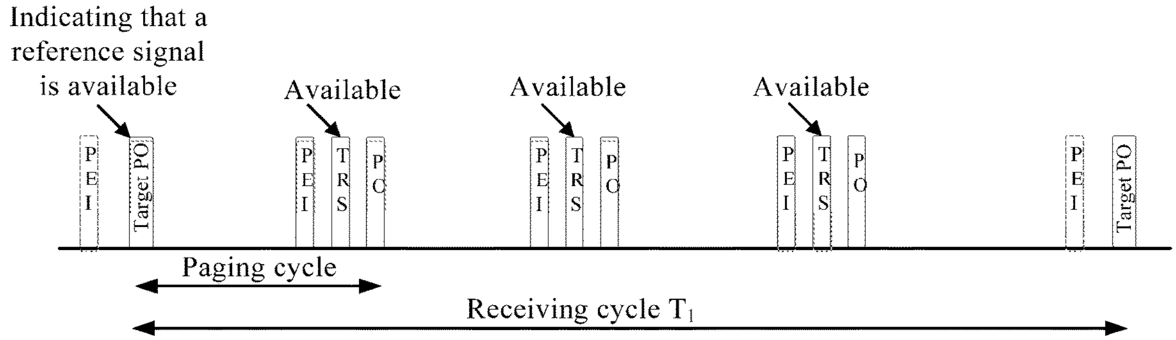
FIG. 5-a
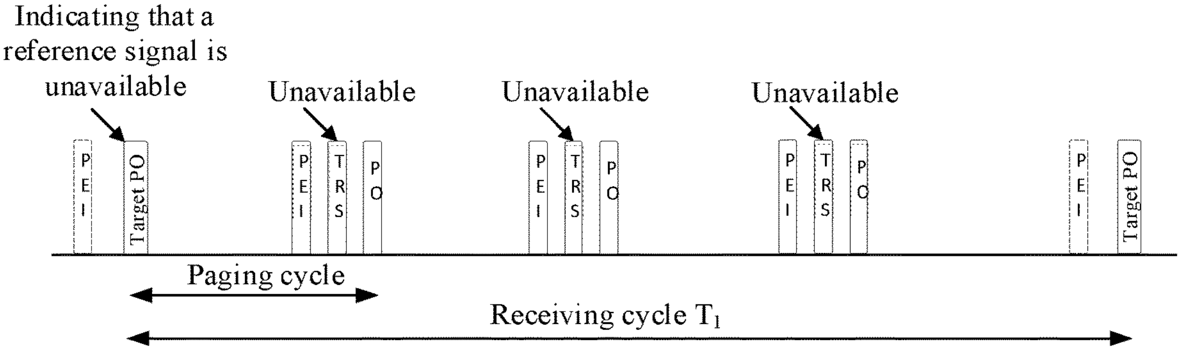
FIG. 5-b

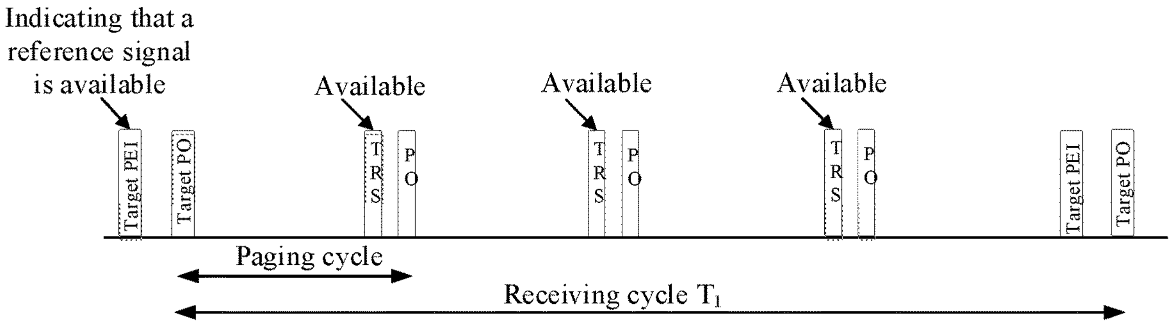
FIG. 6-a
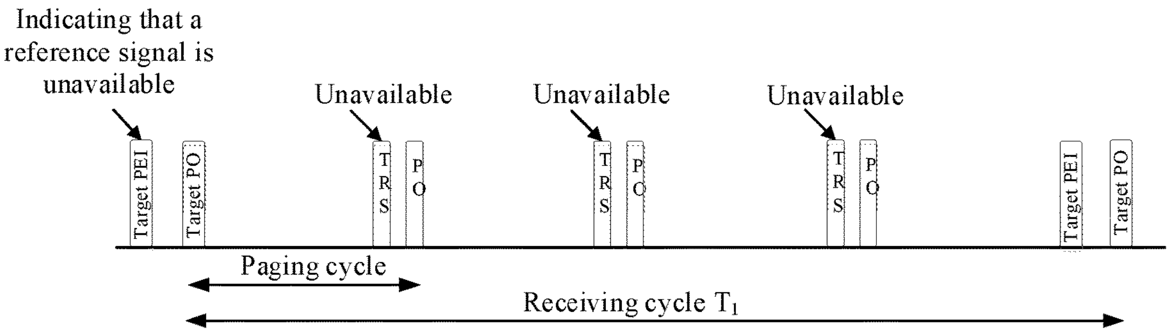
FIG. 6-b
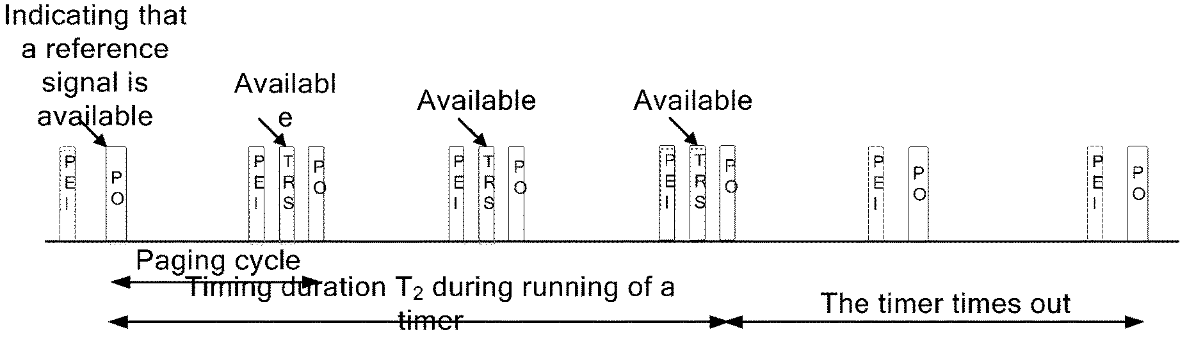
FIG. 7-a

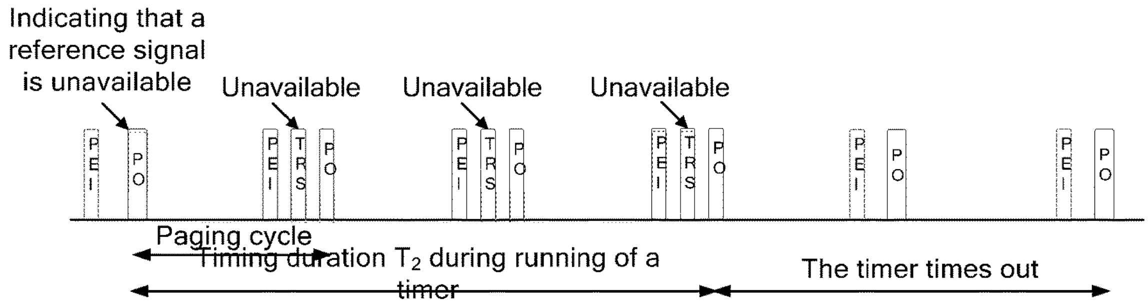
FIG. 7-b
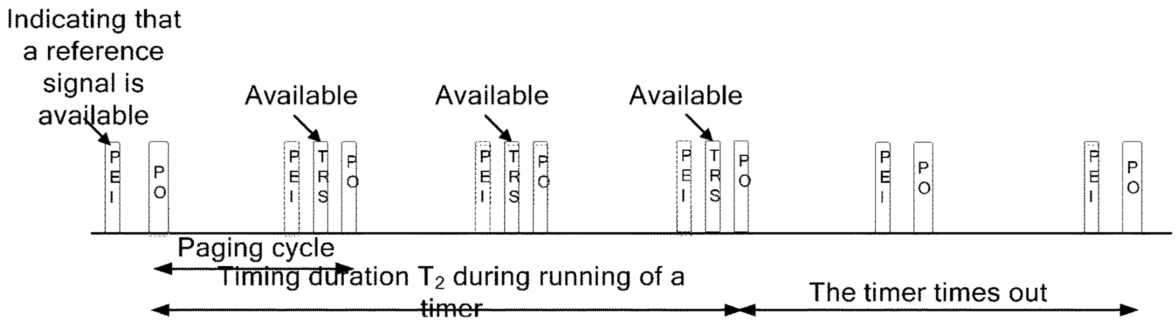
FIG. 8-a
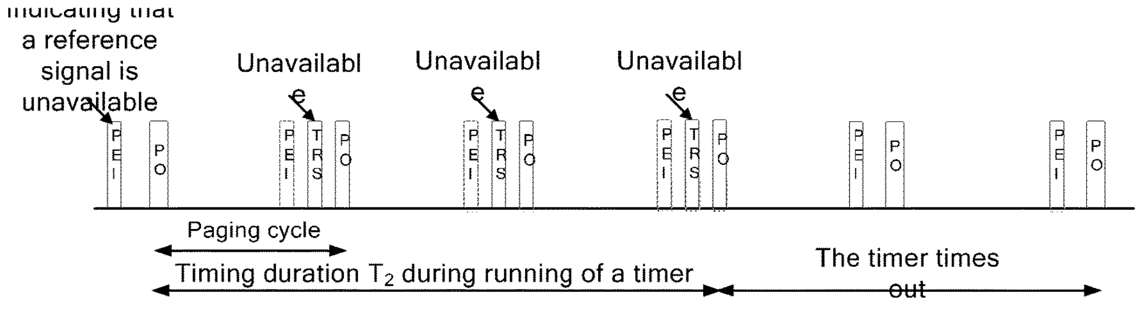
FIG. 8-b

METHOD AND DEVICE FOR INDICATING AVAILABILITY OF A REFERENCE SIGNAL

CROSS-REFERENCE TO RELATED APPLICATIONS

This is the U.S. national stage of application No. PCT/CN2022/085073, filed on Apr. 2, 2022. Priority under 35 U.S.C. § 119(a) and 35 U.S.C. § 365(b) is claimed from Chinese Application No. 202110395308.0, filed Apr. 13, 2021, the disclosure of which is also incorporated herein by reference.

TECHNICAL FIELD

The present disclosure relates to the technical field of communications, and in particular, to a method and device for indicating availability of a reference signal.

BACKGROUND

Before receiving a paging message, a terminal device in an idle/inactive state needs to obtain a reference signal to perform time-frequency synchronization, cell measurement, radio resource management (RRM) measurement, and the like. However, for the terminal device, a network device does not send the reference signal at every reference signal transmission occasion. Therefore, the terminal device needs to determine availability of the reference signal at a corresponding reference signal transmission occasion based on an indication from the network device. However, all schemes for indicating the availability of the reference signal proposed in the related art have certain limitations. Therefore, how to indicate the availability of the reference signal transmitted by the network device has become a problem to be addressed.

SUMMARY

In view of this, embodiments of the present disclosure provide a method and a device for indicating availability of a reference signal, which can determine availability of a reference signal within a valid time domain range based on a valid duration and a reference signal availability indication.

In a first aspect, embodiments of the present disclosure provide a method for indicating availability of a reference signal. The method is applied to a terminal device and includes: determining a valid duration of a reference signal availability indication; and in response to receiving the reference signal availability indication, determining availability of a reference signal within a valid time domain range based on the reference signal availability indication, where the valid time domain range is determined based on the valid duration.

In some embodiments, the determining the valid duration of the reference signal availability indication includes: obtaining the valid duration of the reference signal availability indication based on a system broadcast message or radio resource control (RRC) signaling.

In some embodiments, a length of the valid duration is an integer multiple of a paging cycle.

In some embodiments, the valid duration includes one or a combination of two or more of the following information: a receiving cycle T1 of the reference signal availability indication; a quantity M of paging cycles; and a timing duration T2.

In some embodiments, the receiving the reference signal availability indication includes: determining a target resource location based on the valid duration; and receiving the reference signal availability indication at the target resource location.

In some embodiments, the determining the target resource location based on the valid duration includes: calculating a target paging occasion (PO) based on the valid duration and a paging parameter; and determining the target PO as the target resource location, or determining a first resource location of a paging early indication (PEI) associated with the target PO as the target resource location.

In some embodiments, the receiving the reference signal availability indication at the target resource location includes: in response to determining the target PO as the target resource location, receiving paging downlink control information (paging DCI) at the target PO, and obtaining the reference signal availability indication from the paging DCI; or in response to determining the first resource location of the PEI associated with the target PO as the target resource location, receiving a target PEI at the first resource location, and obtaining the reference signal availability indication from the target PEI.

In some embodiments, determination of the valid time domain range based on the valid duration includes: the valid time domain range starts from the target resource location and has a length equal to the valid duration.

In some embodiments, the receiving the reference signal availability indication includes: calculating each PO based on the paging cycle and a paging parameter; and receiving paging DCI at each PO until the received paging DCI includes the reference signal availability indication, and triggering a timer to perform timing in response to the reference signal availability indication included in the received paging DCI; or determining a location of a PEI associated with each PO, receiving the PEI at each PEI location until the received PEI includes the reference signal availability indication, and triggering a timer to perform timing in response to the reference signal availability indication included in the PEI.

In some embodiments, a timing duration of the timer is the valid duration, and the valid time domain range starts from a time point of triggering the timer to perform timing and has a length equal to the valid duration.

In some embodiments, in response to the paging DCI that includes the reference signal availability indication, the paging DCI is received at each PO located after the valid time domain range to determine whether the paging DCI includes the reference signal availability indication; or in response to the PEI that includes the reference signal availability indication, each PEI located after the valid time domain range is received to determine whether the PEI includes the reference signal availability indication.

In some embodiments, the determining the availability of the reference signal within the valid time domain range based on the reference signal availability indication includes: in response to a determination that the reference signal availability indication includes information indicating that the reference signal is available, determining that all reference signals within the valid time domain range are available; or in response to a determination that the reference signal availability indication includes information indicating that the reference signal is unavailable, determining that none of reference signals within the valid time domain range is available.

In a second aspect, embodiments of the present disclosure provide a method for indicating availability of a reference signal. The method is applied to a network device and includes: sending a valid duration of a reference signal availability indication to a terminal device; and sending the reference signal availability indication to the terminal device, where the reference signal availability indication is used to indicate availability of a reference signal within a valid time domain range, and the valid time domain range is determined based on the valid duration.

In some embodiments, the valid duration is carried in a system broadcast message or RRC signaling.

In some embodiments, a length of the valid duration is an integer multiple of a paging cycle.

In some embodiments, the valid duration includes one or a combination of two or more of the following information: a receiving cycle T1 of the reference signal availability indication; a quantity M of paging cycles; and a timing duration T2.

In some embodiments, the sending the reference signal availability indication to the terminal device includes: determining a target resource location based on the valid duration; and sending the reference signal availability indication at the target resource location.

In some embodiments, the determining the target resource location based on the valid duration includes: calculating a target PO based on the valid duration and a paging parameter; and determining the target PO as the target resource location, or determining a first resource location of a PEI associated with the target PO as the target resource location.

In some embodiments, the sending the reference signal availability indication at the target resource location includes: in response to determining the target PO as the target resource location, carrying the reference signal availability indication in paging DCI corresponding to the target PO; or in response to determining the first resource location of the PEI associated with the target PO as the target resource location, carrying the reference signal availability indication in a target PEI corresponding to the first resource location.

In some embodiments, the sending the reference signal availability indication to the terminal device includes: calculating each PO based on the paging cycle and a paging parameter; and carrying the reference signal availability indication in paging DCI corresponding to at least one of the POs; or carrying the reference signal availability indication in a PEI associated with at least one of the POs.

In some embodiments, indicating the availability of the reference signal within the valid time domain range by the reference signal availability indication includes: in response to a determination that the reference signal availability indication includes information indicating that the reference signal is available, all reference signals within the valid time domain range are available; or in response to a determination that the reference signal availability indication includes information indicating that the reference signal is unavailable, none of reference signals within the valid time domain range is available.

In a third aspect, embodiments of the present disclosure provide a terminal device, including: at least one processor; and at least one memory in communication connection with the processor. The memory stores program instructions executable by the processor. The processor executes the program instructions to perform the method according to the first aspect or any embodiment of the first aspect.

In a fourth aspect, embodiments of the present disclosure provide a network device, including: at least one processor; and at least one memory in communication connection with the processor. The memory stores program instructions executable by the processor, and the processor executes the program instructions to perform the method according to the second aspect or any embodiment of the second aspect.

In a fifth aspect, embodiments of the present disclosure provide a communication chip, including: a processor configured to execute computer program instructions stored in a memory. When the computer program instructions are executed by the processor, the communication chip is caused to perform the method according to the first aspect or any embodiment of the first aspect, or perform the method according to the second aspect or any embodiment of the second aspect.

In a sixth aspect, embodiments of the present disclosure provide a computer-readable storage medium. The computer-readable storage medium includes a stored program. When being executed, the program controls a device including the computer-readable storage medium to perform the method according to the first aspect or any embodiment of the first aspect, or perform the method according to the second aspect or any embodiment of the second aspect.

BRIEF DESCRIPTION OF DRAWINGS

To describe the technical solutions in the embodiments of the present disclosure or in the prior art more clearly, the following briefly describes the drawings required for describing the embodiments or the related art. Apparently, the drawings in the following description show some embodiments of the present disclosure, and a person of ordinary skill in the art may still derive other drawings from these drawings without creative efforts.

FIG. 4 is a flowchart of a method for indicating availability of a reference signal according to an embodiment of the present disclosure;

FIG. 5-*a* and FIG. 5-*b* are schematic diagrams of a method for indicating availability of a reference signal according to Embodiment 1 of the present disclosure;

FIG. 6-*a* and FIG. 6-*b* are schematic diagrams of a method for indicating availability of a reference signal according to Embodiment 2 of the present disclosure;

FIG. 7-*a* and FIG. 7-*b* are schematic diagrams of a method for indicating availability of a reference signal according to Embodiment 3 of the present disclosure;

FIG. 8-*a* and FIG. 8-*b* are schematic diagrams of a method for indicating availability of a reference signal according to Embodiment 4 of the present disclosure;

DESCRIPTION OF EMBODIMENTS

In order to make the objectives, technical solutions and advantages of the embodiments of the present disclosure clearer, the technical solutions in the embodiments of the present disclosure will be clearly and completely described below in conjunction with the drawings in the embodiments of the present disclosure. Obviously, the described embodiments are some, rather than all of the embodiments of the present disclosure. All other embodiments obtained by those of ordinary skill in the art based on the embodiments of the present disclosure without creative efforts should fall within the protection scope of the present disclosure.

Figure 1:
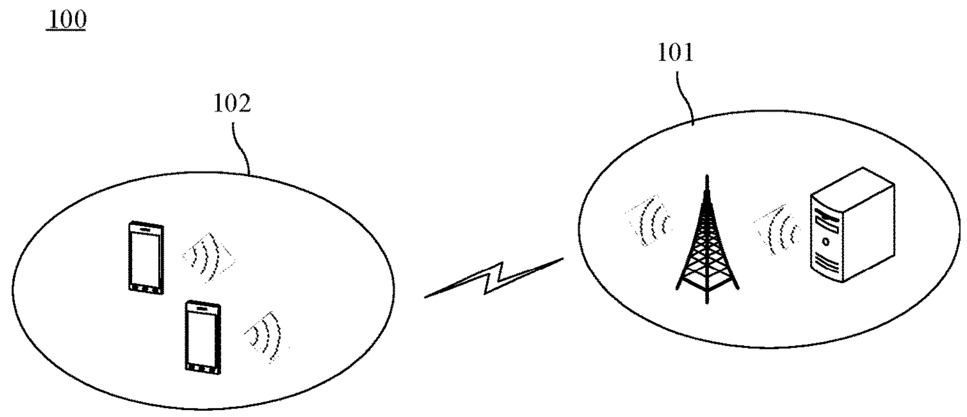
FIG. 1 is a schematic diagram illustrating a scenario of a communication system according to an embodiment of the present disclosure.

FIG. 1 is a schematic diagram illustrating a scenario of a communication system according to an embodiment of the present disclosure. As shown in FIG. 1, the communication system 100 may include at least one network device 101 and at least one terminal device 102. A connection is implemented between the network device 101 and the terminal device 102, between terminal devices 102, and between network devices 101 by a wired or wireless communication technology. It should be noted that quantities and forms of the terminal devices 102 and the network devices 101 shown in FIG. 1 do not constitute a limitation on the embodiments of the present disclosure. In different embodiments, the network device 101 can also be connected to a core network device that is not shown in FIG. 1.

It should be noted that a wireless communication system mentioned in the embodiments of the present disclosure includes but is not limited to: a Narrow Band-Internet of Things (NB-IoT), a Global System 100 for Mobile Communications (GSM 100), an Enhanced Data Rate for GSM Evolution (EDGE), a Wideband Code Division Multiple Access (WCDMA) system, a Code Division Multiple Access 2000 (CDMA2000) system, a Time Division-Synchronization Code Division Multiple Access (TDSCDMA) system, a Long Term Evolution (LTE) system, a fifth generation mobile communication system, a vehicle wireless short-range communication system, and a future mobile communication system.

In embodiments of the present disclosure, the above network device 101 is a device deployed in a wireless access network to provide a wireless communication function for the terminal device 102. The network device 101 may include, but is not limited to, a base station (BS), a station (STA) including an access point (AP) STA and a non-AP STA, a network controller, a transmission and reception point (TRP), a wireless access point (WAP) in a mobile switching center or wireless fidelity (WiFi), and the like. For example, a device that communicates directly with the terminal device 102 through a wireless channel is generally the BS. The BS may include various forms of macro-BSs, micro-BSs, relay stations, APs, remote radio units (RRUs), or the like. Certainly, the terminal device 102 can also perform wireless communication with another network device 101 with the wireless communication function. This is not uniquely limited in the present disclosure.

The terminal device 102 may include, for example, a user equipment (UE), a mobile station (MS), and a mobile terminal (MT). The terminal device 102 is a device for providing voice and/or data communication for a user, such as a handheld device with a wireless connection function, a vehicle-mounted device, a wearable device, a computing device, or another processing device connected to a wireless modem. At present, for example, some terminals are: a mobile phone, a tablet, a laptop, a palmtop, a mobile Internet device (MID), a wearable device, a virtual reality (VR) device, an augmented reality (AR) device, and wireless terminals in industrial control, self driving, a remote medical surgery, a smart grid, transportation safety, a smart city, and a smart home. Certainly, names of the devices may vary in different systems, and are not listed or described one by one.

In the communication system shown in FIG. 1, a terminal device in an idle/inactive state needs to complete time-frequency synchronization, cell measurement, RRM measurement, and the like using a reference signal transmitted by the network device, before receiving a paging message, in other words, when monitoring a physical downlink control channel (PDCCH) and a corresponding physical downlink shared channel (PDSCH). However, for the terminal device, the network device does not send the reference signal at each reference signal transmission occasion. The terminal device needs to determine availability of the reference signal at the reference signal transmission occasion based on an indication of the network device. In the related art, the network device indicates the availability of the reference signals according to following methods.

Figure 2:
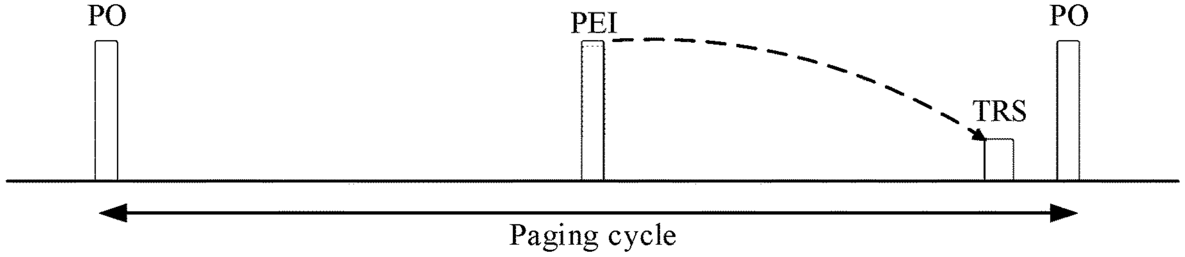
FIG. 2 is a schematic diagram of a method for indicating availability of a reference signal in the related art.
Figure 3:
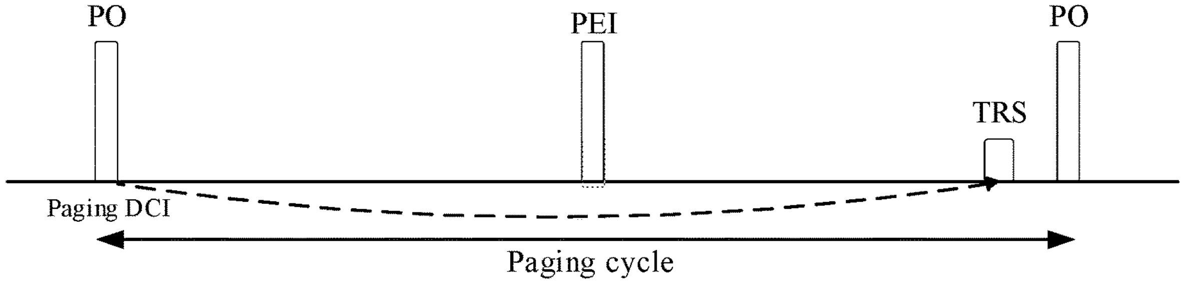
FIG. 3 is a schematic diagram of another method for indicating availability of a reference signal in the related art.

In a first method, as shown in FIG. 2, a paging early indication (PEI) is used to indicate, to the terminal device, whether a reference signal within a current paging cycle is available and/or whether a reference signal within a next paging cycle is available. In a second method, as shown in FIG. 3, paging downlink control information (paging DCI) is used to indicate whether a reference signal within a next paging cycle is available. The reference signal in the first method and the second method may be, for example, a channel state information-reference signal (CSI-RS) or a tracking reference signal (TRS). The TRS is used as an example in FIG. 2 and FIG. 3.

In the first method, it is considered that one PEI is generally associated with a plurality of paging occasions (POs). When one PEI is associated with the plurality of POs, the terminal device often does not need to monitor the PEI before each of the plurality of POs. If the UE does not receive the PEI before a certain PO, the terminal device is unable to obtain a reference signal availability indication from the PEI. Therefore, how to indicate the availability of the reference signal by using the PEI has become a problem to be addressed.

In the second method, the paging DCI needs to be obtained by monitoring the PDCCH at the PO, and whether to monitor the PDCCH at the PO is determined based on the PEI. Due to a high possibility that a PO associated with the PEI is not monitored according to the PEI, it is also difficult to effectively obtain the reference signal availability indication according to the second method. Therefore, how to obtain the reference signal availability indication using the paging DCI has become a problem to be addressed.

Considering that the methods for obtaining the reference signal availability indication provided in the related art have certain drawbacks, the embodiments of the present disclosure provide a scheme for indicating the availability of the reference signal. In the embodiments of the present disclosure, the network device sends the reference signal availability indication and valid duration of the reference signal availability indication to the terminal device. The terminal device can determine availability of a reference signal within a valid time domain range based on the valid duration and the reference signal availability indication. A method for indicating availability of a reference signal in the embodiments of the present disclosure is described in detail below with reference to the accompanying drawings.

FIG. 4 is a flowchart of a method for indicating availability of a reference signal according to an embodiment of the present disclosure. As shown in FIG. 4, the method includes following processing steps.

In step 201, a terminal device determines a valid duration of a reference signal availability indication. In some embodiments, the valid duration may be carried in a system broadcast message or radio resource control (RRC) signaling. The terminal device receives the system broadcast message or the RRC signal sent by a network device, and obtains the valid duration of the reference signal availability indication from the system broadcast message or the RRC signaling.

In some embodiments, a length of the valid duration is an integer multiple of a paging cycle. In some embodiments, the valid duration includes one or a combination of two or more of a receiving cycle $T_1$ of the reference signal availability indication, a quantity M of paging cycles, and a timing duration $T_2$.

In some embodiments, the valid duration may be the receiving cycle $T_1$ of the reference signal availability indication. In some embodiments, the receiving cycle may alternatively be represented by the quantity M of paging cycles. That is, the terminal device can receive the reference signal availability indication every cycle $T_1$ or every M paging cycles. In some embodiments, the valid duration may be the timing duration $T_2$. In some embodiments, the timing duration may alternatively be represented by the quantity M of paging cycles. In some embodiments, in response to obtaining the reference signal availability indication, the terminal device starts a timer whose timing duration is $T_2$ or M paging cycles. In response to the expiring of the timing, the terminal device needs to receive a PEI or paging downlink control information (paging DCI) again to obtain the reference signal availability indication.

In step 202, in response to receiving the reference signal availability indication, the terminal device determines availability of a reference signal within a valid time domain range based on the reference signal availability indication. The valid time domain range may be determined based on the above valid duration.

In some embodiments, the valid duration is represented as the receiving cycle $T_1$ of the reference signal availability indication. In this case, the valid time domain range starts from a location of a resource carrying the reference signal availability indication and has a time domain length equal to the cycle $T_1$. In some embodiments, the valid duration is represented as the timing duration $T_2$. In response to detecting the reference signal availability indication, the terminal device triggers the timer to perform timing. The timing duration of the timer is the $T_2$. Correspondingly, the valid time domain range starts from a time domain location of the reference signal availability indication and has a time domain length equal to the timing duration $T_2$.

The terminal device determines the availability of the reference signal within the valid time domain based on the reference signal availability indication in the following method. In response to a determination that the reference signal availability indication includes information indicating that the reference signal is available, the terminal device determines that all reference signals within the valid time domain range are available. In response to a determination that the reference signal availability indication includes information indicating that the reference signal is unavailable, the terminal device determines that none of reference signals within the valid time domain range is available.

In some embodiments, the reference signal availability indication is carried in the paging DCI or the PEI. The terminal device obtains the reference signal availability indication by receiving the paging DCI or the PEI. In some embodiments, after obtaining the valid duration of the reference signal availability indication, the terminal device can calculate a target resource location based on the valid duration. The terminal device can receive the reference signal availability indication at the target resource location. In some embodiments, the terminal device calculates the target resource location based on the valid duration in the following method. The terminal device calculates a target PO based on the valid duration and a paging parameter. The calculated target PO or a first resource location of a PEI associated with the target PO is the target resource location.

In response to determining the target PO as the target resource location, the terminal device receives the paging DCI at the target PO, and obtains the reference signal availability indication from the paging DCI. In response to determining the first resource location of the PEI associated with the target PO as the target resource location, the terminal device receives a target PEI at the first resource location, and obtains the reference signal availability indication from the target PEI.

In an Embodiment 1, the terminal device obtains the reference signal availability indication from the paging DCI. For example, the network device configures the receiving cycle $T_1$ of the reference signal availability indication for a UE through the system broadcast messages or the RRC signaling. Based on the paging parameter and the cycle $T_1$, the terminal device calculates the target PO for receiving the reference signal availability indication. In some embodiments, the cycle $T_1$ is M multiple of the paging cycle. In some embodiments, the network device can also configure a parameter M for the UE through the system broadcast messages or the RRC signaling. The terminal device determines the receiving cycle $T_1$ based on the parameter M, in other words, $T_1$=M*the paging cycle. The terminal device calculates the target PO based on paging parameter and the cycle $T_1$ in the following method.

The terminal device calculates a paging frame (PF), in other words, determines a system frame number (SFN) of the target PO, according to a following formula:

$$(\text{SFN}+\text{PF\_offset}) \bmod T_1=(T_1 \text{ div } N)*(\text{UE\_ID} \bmod N).$$

Next, the terminal device determines an index (PO index) of the target PO in the PF based on a parameter i_s:

$$\text{i\_s}=\text{floor}(\text{UE\_ID}/N) \bmod \text{Ns}$$

In an existing protocol, PF_Offset is used to determine a start time interval of the PF, in other words, a start frame number of the PF.

N indicates a quantity of PFs in the paging cycle in the existing protocol.

UE_ID: 5G-S-TMSI mod 1024. The 5G-S-TMSI is an acronym of 5G-Serving-Temporary Mobile Subscriber Identity.

i_s indicates the index of the target PO in the PF.

$T_1$ indicates the receiving cycle of the reference signal availability indication.

Ns indicates a quantity of POs included in one PF. The PO herein is determined based on the paging cycle, and a plurality of POs can be included between two adjacent target POs.

As shown in FIG. 5-*a*, in response to a determination that paging DCI corresponding to the target PO indicates that the reference signal is available, all reference signals (such as the TRS) within a time domain range with the target PO as a start location and the cycle $T_1$ as a time domain length are available. As shown in FIG. 5-*b*, in response to a determination that the paging DCI corresponding to the target PO indicates that the reference signal is unavailable, all the reference signals (such as the TRS) within the time domain range with the target PO as the start location and the cycle $T_1$ as the time domain length are unavailable.

In some embodiments, the terminal device does not need to determine, based on the PEI associated with the calculated target PO, whether to monitor the target PO to obtain the paging DCI. As shown in FIG. 5-*a* and FIG. 5-*b*, the target PO is a PO that the terminal device needs to monitor, and the PEI (shown by the dashed line) associated with the target PO does not need to be monitored. For a PO rather than the target PO, the terminal device needs to determine, based on a PEI, whether to receive the paging DCI at the PO.

In an Embodiment 2, the terminal device obtains the reference signal availability indication from the PEI. For example, the network device configures the receiving cycle $T_1$ of the reference signal availability indication for a UE through the system broadcast messages or the RRC signaling. Based on the paging parameter and the cycle $T_1$, the terminal device calculates the target PO for receiving the reference signal availability indication. For a method used by the terminal device to calculate the target PO, reference may be made to Embodiment 1, and details are not described herein again.

Next, based on the target PO, the terminal device determines the first resource location of the PEI associated with target PO. The terminal device receives the target PEI from the first resource location, and obtains the reference signal availability indication from the target PEI.

As shown in FIG. 6-*a*, in response to a determination that the target PEI received at the first resource location indicates that the reference signal is available, a reference signal (such as the TRS) corresponding to the PO in the current cycle $T_1$ is available. As shown in FIG. 6-*b*, in response to a determination that the target PEI received at the first resource location indicates that the reference signal is unavailable, the reference signal (such as the TRS) corresponding to the PO in the current cycle $T_1$ is unavailable.

In addition to obtaining the reference signal availability indication at the target PO or the PEI associated with the target PO, the terminal device can also monitor the POs one by one or the PEIs one by one to obtain the reference signal availability indication. In response to obtaining the reference signal availability indication, the timer is started for timing. For example, the terminal device can calculate each PO based on the paging cycle and the paging parameter. The PO herein is calculated based on a single paging cycle, and the above target PO is calculated based on the cycle $T_1$. Therefore, each PO herein is different from the target PO. The terminal device receives the paging DCI at each PO until the received paging DCI includes the reference signal availability indication, and triggers the timer to perform timing in response to the reference signal availability indication in the paging DCI. Alternatively, after calculating each PO, the terminal device determines a location of a PEI associated with each PO, receives the PEI at each PEI location until the received PEI includes the reference signal availability indication, and triggers the timer to perform timing in response to the reference signal availability indication included in the received PEI. In some embodiments, the timing duration of the timer is the valid duration. Correspondingly, the valid time domain range starts from a time point of triggering the timer to perform timing and has a time domain length equal to the valid duration.

In some embodiments, for a PO within a timing range of the timer, the terminal device determines, based on a PEI associated with the PO, whether to monitor the PO. For each PO beyond the timing range of the timer, the terminal device receives paging DCI to determine whether the paging DCI includes the reference signal availability indication, and triggers the timer once the reference signal availability indication is detected in the paging DCI. Alternatively, for each PEI beyond the timing range of the timer, the terminal device receives the PEI to determine whether the PEI includes the reference signal availability indication, and triggers the timer once the reference signal availability indication is detected in the PEI.

In an Embodiment 3, the terminal device obtains the reference signal availability indication from the paging DCI. For example, the network device configures the timing duration $T_2$ of the timer for a UE through the system broadcast messages or the RRC signaling. As shown in FIG. 7-*a* and FIG. 7-*b*, the $T_2$ is equal to three paging cycles. The terminal device calculates locations of the POs based on the paging cycle, and then receives the paging DCI at each PO. The terminal device triggers the timer to perform timing in response to a determination that the paging DCI includes the reference signal availability indication. The timing duration is $T_2$. During running of the timer, the terminal device determines, based on the PEI, whether to monitor the PO. A PO after the timer times out needs to be monitored by default, and accordingly there is no need to determine, based on the PEI, whether to monitor the PO. In some embodiments, as shown in FIG. 7-*a*, in response to a determination that the paging DCI indicates that the reference signal is available, all reference signals (such as TRS) during the running of the timer are available. As shown in FIG. 7-*b*, in response to a determination that the paging DCI indicates that the reference signal is unavailable, all the reference signals (such as the TRS) during the running of the timer are unavailable.

In an Embodiment 4, the terminal device obtains the reference signal availability indication from the PEI. For example, the network device configures the timing duration $T_2$ of the timer for a UE through the system broadcast messages or the RRC signaling. As shown in FIG. 8-*a* and FIG. 8-*b*, $T_2$ is equal to three paging cycles. The terminal device calculates a location of the PO based on the paging cycle, and then determines a location of each PEI based on the location of the PO. The terminal device receives PEIs one by one until the PEI includes the reference signal availability indication. In response to the reference signal availability indication included in the received PEI, the terminal device triggers the timer to perform timing. The timing duration is $T_2$. The terminal device may not receive a PEI during the running of the timer, for example, PEIs represented by dashed lines in FIG. 8-*a* and FIG. 8-*b*. A PEI after the timer times out needs to be received by default. In some embodiments, as shown in FIG. 8-*a*, in response to a determination that the PEI indicates that the reference signal is available, all reference signals (such as the TRS) during the running of the timer are available. As shown in FIG. 8-*b*, in response to a determination that the PEI indicates that the reference signal is unavailable, all the reference signals (such as the TRS) during the running of the timer are unavailable.

Figure 9:
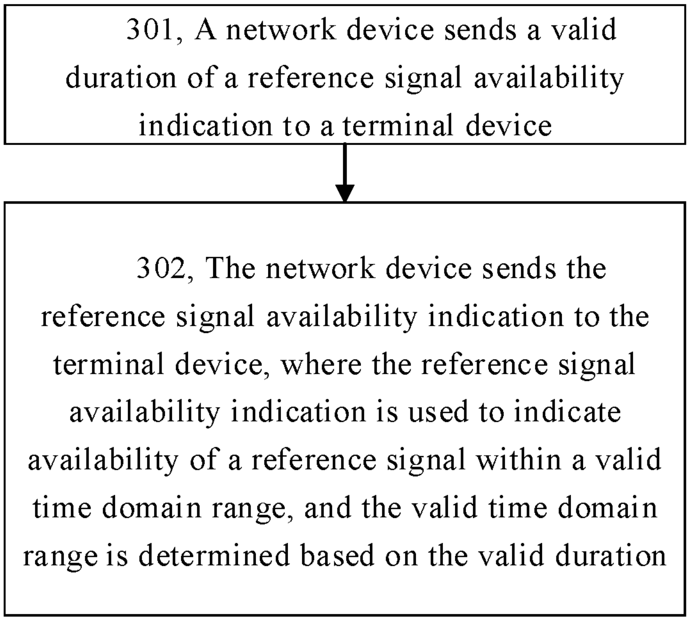
FIG. 9 is a flowchart of another method for indicating availability of a reference signal according to an embodiment of the present disclosure.

FIG. 9 is a flowchart of another method for indicating availability of a reference signal according to an embodiment of the present disclosure. The method is applied to a network device. As shown in FIG. 9, the method includes following steps.

In step 301, the network device sends a valid duration of a reference signal availability indication to a terminal device. The valid duration is carried in a system broadcast message or RRC signaling. In some embodiments, a length of the valid duration is an integer multiple of a paging cycle. For example, the valid duration includes one or a combination of two or more of a receiving cycle $T_1$ of the reference signal availability indication, a quantity M of paging cycles, and timing duration $T_2$.

In step 302, the network device sends the reference signal availability indication to the terminal device. The reference signal availability indication is used to indicate availability of a reference signal within a valid time domain range, and the valid time domain range is determined based on the valid duration.

In some embodiments, the network device sends the reference signal availability indication to the terminal device in the following method. The network device determines a target resource location based on the valid duration, and sends the reference signal availability indication at the target resource location.

The network device determines the target resource location based on the valid duration in the following method. The network device calculates a target PO based on the valid duration and a paging parameter, and the target PO is the target resource location. Alternatively, the network device determines a first resource location of a PEI associated with the target PO, and the first resource location is the target resource location.

In some embodiments, the network device sends the reference signal availability indication at the target resource location in the following method. When the target PO is the target resource location, the reference signal availability indication is carried in paging DCI corresponding to the target PO.

When the first resource location of the PEI associated with the target PO is the target resource location, the reference signal availability indication is carried in a target PEI corresponding to the first resource location.

In some embodiments, the network device sends the reference signal availability indication to the terminal device in the following method. Each PO is calculated based on the paging cycle and a paging parameter; and the reference signal availability indication is carried in paging DCI corresponding to at least one of the POs, or the reference signal availability indication is carried in a PEI associated with at least one of the POs.

In some embodiments, the reference signal availability indication indicates the availability of the reference signal within the valid time domain range in the following method. In response to a determination that the reference signal availability indication includes information indicating that the reference signal is available, all reference signals within the valid time domain range are available. In response to a determination that the reference signal availability indication includes information indicating that the reference signal is unavailable, none of reference signals within the valid time domain range is available.

In embodiments of the present disclosure, the method for indicating availability of a reference signal, which is executed by the network device, corresponds to the steps executed by the terminal device. For specific content, reference can be made to the description about the terminal device side. Details are not described herein again.

Figure 10:
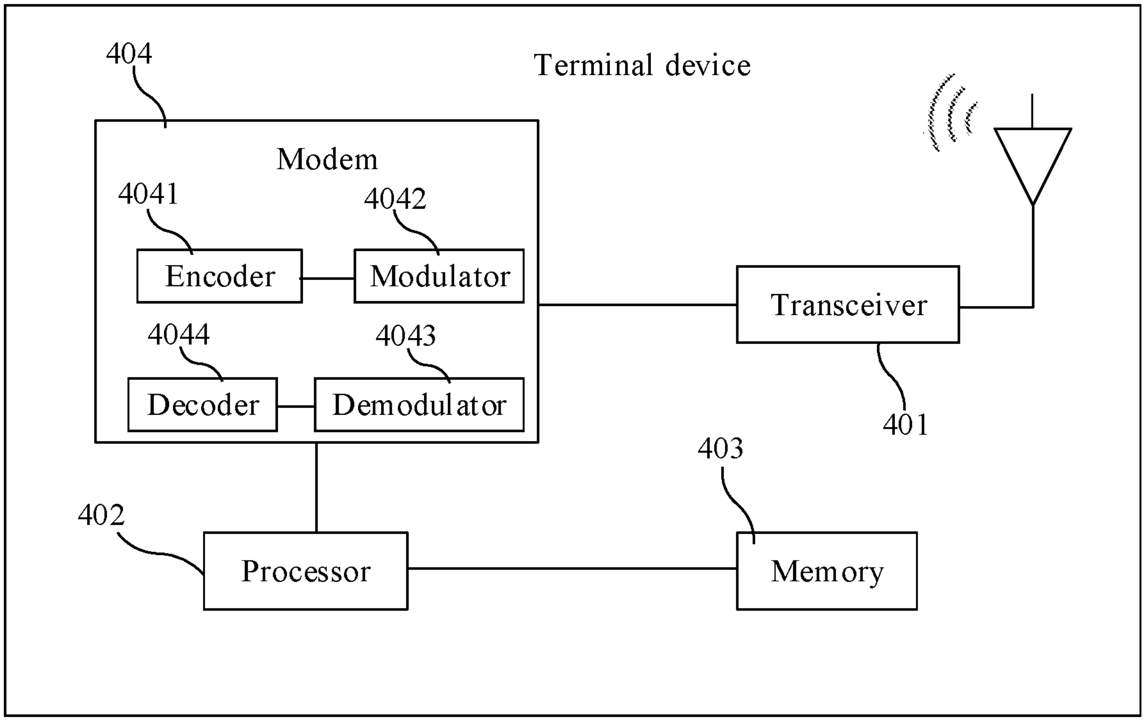
FIG. 10 is a schematic structural diagram of a terminal device according to an embodiment of the present disclosure.

FIG. 10 is a schematic structural diagram of a terminal device according to an embodiment of the present disclosure. FIG. 10 is a simplified schematic diagram of a possible design structure of the terminal device involved in the above method embodiments. The terminal device includes a transceiver 401, a processor 402, a memory 403, and a modem 404. The transceiver 401, the processor 402, the memory 403, and the modem 404 are connected through a bus.

The transceiver 401 performs adjustment (for example, analog conversion, filtering, amplification, and upconversion) on output sampling and generates an uplink signal. The uplink signal is transmitted to the network device in the above embodiments through an antenna. In a downlink, the antenna receives a downlink signal from the network device in the above embodiments. The transceiver 401 adjusts (for example, filters, amplifies, downconverts, and digitizes) the signal received from the antenna and provides input sampling. For example, in the modem 404, an encoder 4041 receives business data and a signaling message that need to be sent on an uplink, and processes (for example, formats, encodes, and interleaves) the business data and the signaling message. A modulator 4042 further performs processing (for example, symbol mapping and modulation) on encoded business data and an encoded signaling message, and provides the aforementioned output sampling. A demodulator 4043 processes (for example, demodulates) the above input sampling and provides symbol estimation. A decoder 4044 processes (for example, de-interleaves and decodes) the symbol estimation and provides decoded data and signaling messages to be sent to the terminal device. The encoder 4041, the modulator 4042, the demodulator 4043, and the decoder 4044 can be implemented by the combined modem 404. These units perform processing based on wireless access technologies adopted by a wireless access network (such as access technologies of LTE, 5G, and other evolution systems). In the embodiment shown in FIG. 9, the transceiver 401 is integrated by a transmitter and a receiver. In other embodiments, the transmitter and the receiver may alternatively be independent of each other.

The processor 402 controls and manages the terminal device, and is configured to execute the processing steps performed by the terminal device in the above method embodiments. For example, the processor 402 is configured to control the terminal device to perform the method for indicating availability of a reference signal and/or other processes of the techniques described in the present disclosure. As an example, the processor 402 is configured to support the terminal device in executing processing processes related to the terminal device in FIG. 2 to FIG. 8. In different embodiments, the processor 402 may include one or more processors, such as one or more CPUs. The processor 402 may be integrated into a chip or may be the chip itself.

The memory 403 is configured to store relevant instructions and data, as well as program code and data of a terminal. In different embodiments, the memory 403 includes but is not limited to a random access memory (RAM), a read-only memory (ROM), an erasable programmable read-only memory (EPROM), a non-transitory computer readable storage medium, or a compact disc read-only memory (CDROM). In this embodiment, the memory 403 is independent of the processor 402. In other embodiments, the memory 403 may alternatively be integrated into the processor 402.

It can be understood that FIG. 10 only illustrates a simplified design of the terminal device. In different embodiments, the terminal device may include any quantity of transmitters, receivers, processors, memories, and the like, and all terminal devices that can implement the present disclosure are within the protection scope of the present disclosure.

Figure 11:
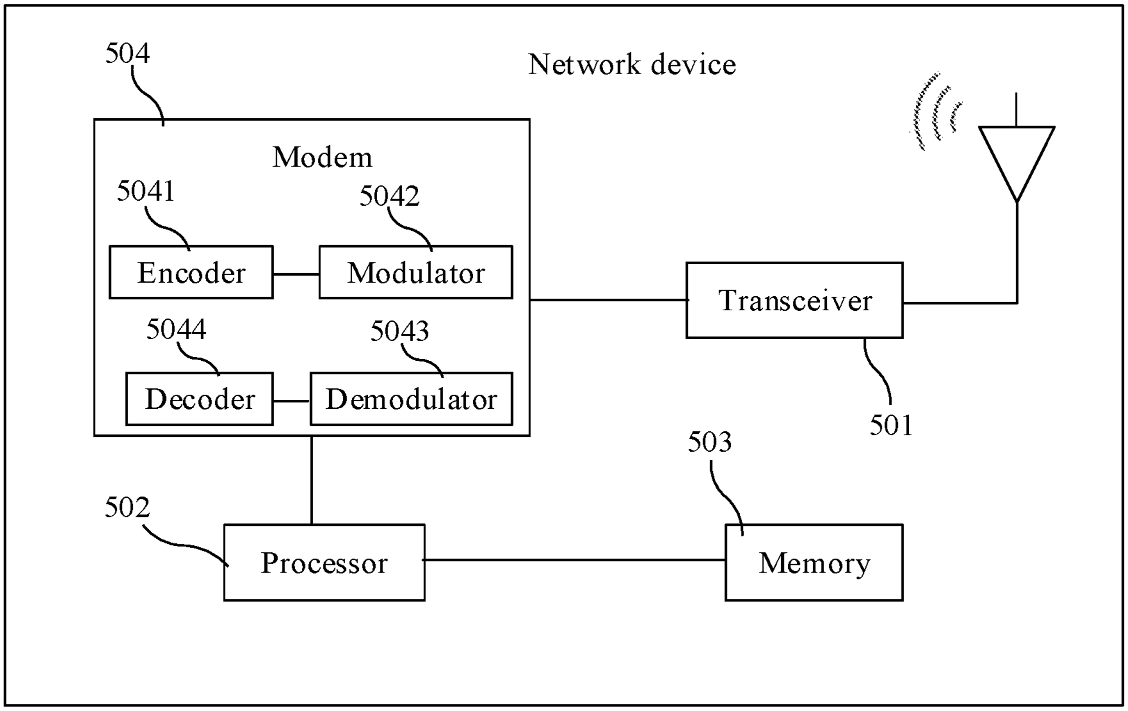
FIG. 11 is a schematic structural diagram of a network device according to an embodiment of the present disclosure.

FIG. 11 is a schematic structural diagram of a network device according to an embodiment of the present disclosure. FIG. 11 is a simplified schematic diagram of a possible design structure of the network device involved in the above method embodiments. The network device includes a transceiver 501, a processor 502, a memory 503, and a modem 504. The transceiver 501, the processor 502, the memory 503, and the modem 504 are connected through a bus.

The transceiver 501 performs adjustment (for example, analog conversion, filtering, amplification, and upconversion) on output sampling and generates a downlink signal. The downlink signal is transmitted to the terminal device in the above embodiments through an antenna. In an uplink, the antenna receives an uplink signal from the terminal device in the above embodiments. The transceiver 501 adjusts (for example, filters, amplifies, downconverts, and digitizes) the signal received from the antenna and provides input sampling. For example, in the modem 504, an encoder 5041 receives business data and a signaling message that need to be sent on a downlink, and processes (for example, formats, encodes, and interleaves) the business data and the signaling message. A modulator 5042 further performs processing (for example, symbol mapping and modulation) on encoded business data and an encoded signaling message, and provides the aforementioned output sampling. A demodulator 5043 processes (for example, demodulates) the above input sampling and provides symbol estimation. A decoder 5044 processes (for example, de-interleaves and decodes) the symbol estimation and provides decoded data and signaling messages to be sent to the network device. The encoder 5041, the modulator 5042, the demodulator 5043, and the decoder 5044 can be implemented by the combined modem 504. These units perform processing based on wireless access technologies adopted by a wireless access network (such as access technologies of LTE, 5G, and other evolution systems). In the embodiment shown in FIG. 11, the transceiver 501 is integrated by a transmitter and a receiver. In other embodiments, the transmitter and the receiver may alternatively be independent of each other.

The processor 502 controls and manages the network device, and is configured to execute the processing steps performed by the network device in the above method embodiments. For example, the processor 502 is configured to control the network device to perform the method for indicating availability of a reference signal and/or other processes of the techniques described in the present disclosure. As an example, the processor 502 is configured to support the network device in executing processing processes related to the network device in FIG. 2 to FIG. 9. In different embodiments, the processor 502 may include one or more processors, such as one or more CPUs. The processor 502 may be integrated into a chip or may be the chip itself.

The memory 503 is configured to store relevant instructions and data, as well as program code and data of a terminal. In different embodiments, the memory 503 includes but is not limited to a RAM, a ROM, an EPROM, a non-transitory computer readable storage medium, or a CDROM. In this embodiment, the memory 503 is independent of the processor 502. In other embodiments, the memory 503 may alternatively be integrated into the processor 502.

It can be understood that FIG. 11 only illustrates a simplified design of the network device. In different embodiments, the network device may include any quantity of transmitters, receivers, processors, memories, and the like, and all network devices that can implement the present disclosure are within the protection scope of the present disclosure.

Corresponding to the above device embodiments, the embodiments of the present disclosure further provide a communication system. The communication system includes the terminal device shown in FIG. 10 and the network device shown in FIG. 11.

Some embodiments of the present disclosure further provide a computer storage medium. The computer storage medium stores a program, and when the program is executed, some or all of the steps in the embodiments provided in the present disclosure are included. The storage medium may be a magnetic disk, an optical disc, a ROM, a RAM, or the like.

Some embodiments of the present disclosure further provide a computer program product. The computer program product includes executable instructions. When the executable instructions are executed on a computer, the computer is caused to perform some or all of the steps in the above method embodiments.

In the present application, the term "at least one" refers to one or more, and the term "multiple" refers to two or more. The term "and/or" describes associations between associated objects, and it indicates three types of relationships. For example, "A and/or B" may indicate that A alone, A and B, or B alone. "A" and "B" each may be singular or plural. The character "/" generally indicates that the associated objects are in an "or" relationship. The term "at least one of the followings" or a similar expression refers to any combination of these items, including any combination of single items or plural items. For example, at least one of a, b, and c may represent: a, b, c, a and b, a and c, b and c, or a, b, and c, where a, b, and c may be singular or plural.

Those of ordinary skill in the art may be aware that units and algorithm steps described in the embodiments of the present disclosure can be implemented by electronic hardware or a combination of computer software and electronic hardware. Whether the functions are performed by hardware or software depends on particular applications and design constraints of the technical solutions. A person skilled in the art may use different methods to implement the described functions for each specific application, but such implementation should not be considered to be beyond the scope of the present disclosure.

A person skilled in the art can clearly understand that for convenience and brevity of description, reference may be made to corresponding processes in the foregoing method embodiments for specific working processes of the foregoing system, apparatus, and units. Details are not described herein again.

In the embodiments provided in this specification, if implemented in a form of a software functional unit and sold or used as a stand-alone product, any function may be stored in a computer-readable storage medium. Based on such understanding, the technical solutions of the present disclosure essentially or the part contributing to the prior art or part of the technical solution may be implemented in a form of a software product. The computer software product may be stored in a storage medium, and includes several instructions for enabling a computer device (which may be a personal computer, a server, a network device, or the like) to perform all or some steps of the method according to each of the embodiments of the present disclosure. The foregoing storage medium includes: any medium that can store program code, such as a USB flash disk, a removable hard disk, a read-only memory (ROM), a random access memory (RAM), a magnetic disk, or an optical disc.

The above descriptions are merely preferred examples of the present disclosure, and are not intended to limit the present disclosure. Any modifications, equivalent replacements, improvements, and the like made within the spirit and principle of the present disclosure shall fall within the protection scope of the present disclosure.

What is claimed is:

1. A method for indicating availability of a reference signal, applied to a terminal device and comprising:

determining a valid duration of a reference signal availability indication; and in response to receiving the reference signal availability indication, determining availability of a reference signal within a valid time domain range based on the reference signal availability indication, wherein the valid time domain range is determined based on the valid duration, wherein the receiving the reference signal availability indication comprises:

determining a target resource location based on the valid duration; and receiving the reference signal availability indication at the target resource location, wherein the determining the target resource location based on the valid duration comprises:

calculating a target paging occasion (PO) based on the valid duration and a paging parameter; and determining the target PO as the target resource location.

2. The method according to claim 1, wherein the determining the valid duration of the reference signal availability indication comprises:

obtaining the valid duration of the reference signal availability indication based on a system broadcast message or radio resource control (RRC) signaling.

3. The method according to claim 1, wherein a length of the valid duration is an integer multiple of a paging cycle.

4. The method according to claim 3, wherein the valid duration comprises one or a combination of two or more of the following information:

a receiving cycle T1 of the reference signal availability indication;

a quantity M of paging cycles; and a timing duration T2.

5. The method according to claim 1, wherein the receiving the reference signal availability indication at the target resource location comprises:

receiving paging downlink control information (paging DCI) at the target PO, and obtaining the reference signal availability indication from the paging DCI.

6. The method according to claim 1, wherein the determination of the valid time domain range based on the valid duration comprises:

the valid time domain range starts from the target resource location and has a time domain length equal to the valid duration.

7. The method according to claim 1, wherein the receiving the reference signal availability indication comprises:

calculating each PO based on a paging cycle and a paging parameter; and receiving paging DCI at each PO until the received paging DCI comprises the reference signal availability indication, and triggering a timer to perform timing in response to the reference signal availability indication comprised in the received paging DCI.

8. The method according to claim 7, wherein a timing duration of the timer is the valid duration, and the valid time domain range starts from a time point of triggering the timer to perform timing and has a time domain length equal to the valid duration.

9. The method according to claim 7, wherein the paging DCI is received at each PO located after the valid time domain range to determine whether the paging DCI comprises the reference signal availability indication.

10. The method according to claim 1, wherein the determining the availability of the reference signal within the valid time domain range based on the reference signal availability indication comprises:

in response to a determination that the reference signal availability indication comprises information indicating that the reference signal is available, determining that all reference signals within the valid time domain range are available; and in response to a determination that the reference signal availability indication comprises information indicating that the reference signal is unavailable, determining that none of reference signals within the valid time domain range is available.

11. The method according to claim 1, wherein the determining the target resource location based on the valid duration comprises:

calculating the target paging occasion (PO) based on the valid duration and the paging parameter; and determining a first resource location of a paging early indication (PEI) associated with the target PO as the target resource location.

12. The method according to claim 11, wherein the receiving the reference signal availability indication at the target resource location comprises:

receiving a target PEI at the first resource location, and obtaining the reference signal availability indication from the target PEI.

13. The method according to claim 1, wherein the receiving the reference signal availability indication comprises:

calculating each PO based on a paging cycle and the paging parameter; and determining a location of an associated PEI for each PO, receiving the PEI at each PEI location until the received PEI comprises the reference signal availability indication, and triggering a timer to perform timing in response to the reference signal availability indication comprised in the received PEI.

14. The method according to claim 13, wherein a timing duration of the timer is the valid duration, and the valid time domain range starts from a time point of triggering the timer to perform timing and has a time domain length equal to the valid duration.

15. The method according to claim 13, wherein each PEI located after the valid time domain range is received to determine whether the PEI comprises the reference signal availability indication.

16. A terminal device, comprising:

at least one processor; and at least one memory in communication connection with the at least one processor;

wherein the at least one memory stores program instructions executable by the at least one processor, and the at least one processor executes the program instructions to:

determine a valid duration of a reference signal availability indication; and in response to receiving the reference signal availability indication, determine availability of a reference signal within a valid time domain range based on the reference signal availability indication, wherein the valid time domain range is determined based on the valid duration, wherein the at least one processor executes the program instructions to:

determine a target resource location based on the valid duration; and receive the reference signal availability indication at the target resource location, wherein the at least one processor executes the program instructions to:

calculate a target paging occasion (PO) based on the valid duration and a paging parameter; and determine the target PO as the target resource location.

17. The terminal device according to claim 16, wherein the valid duration of the reference signal availability indication is carried in a system broadcast message or RRC signaling.

18. A non-transitory computer-readable storage medium, wherein the computer-readable storage medium comprises a stored program, and when being executed, the program causes a device comprising the computer-readable storage medium to:

determine a valid duration of a reference signal availability indication; and in response to receiving the reference signal availability indication, determine availability of a reference signal within a valid time domain range based on the reference signal availability indication, wherein the valid time domain range is determined based on the valid duration, wherein when being executed, the program causes a device comprising the computer-readable storage medium to:

determine a target resource location based on the valid duration; and receive the reference signal availability indication at the target resource location, wherein when being executed, the program causes a device comprising the computer-readable storage medium to:

calculate a target paging occasion (PO) based on the valid duration and a paging parameter; and determine the target PO as the target resource location.

* * * * *